United States Patent [19]

Juhasz

[11] Patent Number: 5,221,988
[45] Date of Patent: Jun. 22, 1993

[54] POCKEL CELL DAMPING SYSTEM

[75] Inventor: Tibor Juhasz, Irvine, Calif.

[73] Assignee: Intelligent Surgical Lasers, San Diego, Calif.

[21] Appl. No.: 797,122

[22] Filed: Nov. 21, 1991

[51] Int. Cl.$^5$ .............. G02F 1/03; G02F 1/29; H01S 3/11; H01S 3/115

[52] U.S. Cl. .................. 359/247; 359/245; 359/249; 359/254; 359/257; 359/320; 372/10; 372/12

[58] Field of Search ........... 359/245, 247, 249, 251, 359/254, 257, 320; 372/30, 10, 12, 27

[56] References Cited

U.S. PATENT DOCUMENTS

| 3,572,897 | 3/1971 | Bousky | 359/245 |
| 3,653,743 | 4/1972 | Kiefer et al. | 359/249 |
| 3,663,091 | 5/1972 | Lee | 359/245 |
| 4,620,113 | 10/1986 | Sizer, II | 307/270 |
| 4,629,993 | 12/1986 | Bouvier | 328/67 |
| 4,896,119 | 1/1990 | Williamson | 330/4.3 |
| 5,075,795 | 12/1991 | Miller et al. | 359/257 |
| 5,119,383 | 6/1992 | Duling, III et al. | 372/30 |

Primary Examiner—Bruce Y. Arnold
Assistant Examiner—Evelyn A. Lester
Attorney, Agent, or Firm—Nydegger & Associates

[57] ABSTRACT

A device for damping the vibrations of an elongated, substantially rectangular crystal in response to an applied high voltage electrical field comprises a pair of dielectric panes which are impedance matched with the crystal and are attached to opposite sides thereof. As attached to the crystal, each of the panes is disposed at the periphery of the electrical field, and an aluminum block is attached to each of the panes on a surface which is opposite from the crystal. The mass of aluminum blocks, and the texture of their exposed outer surfaces cooperate to mechanically dampen the acoustic vibrations transmitted from the crystal through the panes. Additionally, the rectangular dimensions of the crystal are chosen to delay the propagation of acoustic waves from the surfaces of the crystal to its center. This is done in order to preserve an optical window through the crystal for a period of time during which this window, at the center of the crystal, experiences only the electro-optical effect caused by an applied electrical field and does not experience the "ringing" which is caused by acoustic waves.

21 Claims, 2 Drawing Sheets

POCKEL CELL DAMPING SYSTEM

FIELD OF THE INVENTION

The present invention pertains generally to electro-optical switches. More specifically, the present invention pertains to devices for damping the acoustical response of an electrooptical crystal to the excitation of an externally applied electrical field. The present invention is particularly, but not exclusively, useful for increasing the repetition rate of a regenerative amplifier by mechanically damping the electro-optical switch of the regenerative amplifier.

BACKGROUND OF THE INVENTION

It is well known that lasers can be used with great efficacy in a wide variety of applications. For each particular application, this efficacy is significantly dependent on the physical characteristics of the generated laser beam. When a laser beam is pulsed, the principle variables include the wavelength of the light in the beam, the time duration for each of the laser pulses, the repetition rate of the pulses, and the intensity of the laser during each pulse (i.e. the number of photons striking a target area in a given unit of time). It happens that a beam which can deliver laser energy in pulses is very efficacious for certain applications. This is particularly so when the laser pulses in the beam are of extremely short duration, e.g. several picoseconds. While no one variable can be considered in isolation, indeed all of the above-mentioned variables are important in shaping a pulsed laser beam, the concern of the present invention centers on factors affecting the ability of a regenerative amplifier to effectively control the intensity and repetition rate of pulses in the beam.

If the particular application is best accomplished using an uninterrupted continuous beam of light, then the duration of the beam is of minimal importance. On the other hand, it is known that many applications are best accomplished using a pulsed laser beam in which the intensity of each pulse and the repetition rate of these pulses can be of extreme importance. For example, several procedures in ophthalmic surgery require very intense light. If such light is not properly controlled, i.e. its intensity is not properly limited, the laser beam will invariably cause unnecessary damage to peripheral tissue. Consequently, the intensity of each pulse in the beam and the period of time between each of these pulses can be critical.

In a typical pulsed laser beam generating system, the intensity and duration of pulses in the beam are established by a regenerative amplifier. For this purpose, the regenerative amplifier includes a laser cavity wherein laser pulses are captured and reflected back and forth along a predetermined path. During the excursions of the laser pulses within the cavity, the pulses pass through a gain medium and are thereby amplified, to increase their intensity or energy level. To control the intensity of the light pulses in the resultant laser beam which emerges from the regenerative amplifier, and the repetition rate of the pulses in this beam, an electro-optical crystal is used which is of a type commonly referred to as a Pockel's cell.

The actual operation of an electro-optical crystal, and consequently the operation of a regenerative amplifier, is dependent on an important property of light which has not yet been mentioned, viz. polarization. Within a regenerative amplifier, it is important that the laser beam be polarized. This is so because, with an ability to selectively change the polarization of the laser beam while it is in the cavity of the regenerative amplifier, the beam can be selectively reflected back and forth in the cavity, or dumped out of the cavity. To do this, the beam must be properly polarized at a point where the laser is incident on a polarizing beam splitter. To obtain this proper polarization, an electro-optical crystal, i.e a Pockel's Cell, is effectively used as a switch.

Importantly, in its operation an electro-optical crystal relies on an electro-optic phenomenon whereby light passing through the crystal will be differently polarized depending upon whether the crystal is subject to an electrical field. Consequently, by selectively subjecting the electro-optical crystal to an electrical field, the polarization of light passing through the crystal can be controlled. This control over the polarization of the laser is obtained as a result of the electro-optic effect which occurs when an electric field is applied to an electro-optical crystal. In most cases, the electro-optic crystal also exhibits a piezoelectric effect in response to an electrical field whereby the electro-optical crystal is deformed by the electric field. Further, it is known that through the strain optic effect the deformation of an electro-optical crystal will also cause the crystal to change the polarization of light passing through the crystal. These various phenomenon need to be reconciled.

It happens that the electro-optic effect is effectively instantaneous. On the other hand, the piezoelectric effect occurs as a wave which is initiated at the surface of the crystal and which, if undamped, is reflected back and forth through the crystal. The consequent variations in the deformation of the electro-optical crystal causes the crystal to acoustically vibrate. Unfortunately, this unwanted vibration occurs both when the electrical field is applied to the crystal and when the electrical field is removed from the crystal. As mentioned above, if this vibration is undamped the consequence is that light passing through the crystal will be subject to rapid changes in polarization through the strain optic effect.

As might be expected, the "ringing" in electro-optical crystals is particularly pronounced when relatively high voltages are imposed on the crystal. The amount of rotation which the crystal can impose on light passing through the crystal, however, is a function of the applied voltage. Thus it happens that high voltages are required to effectively activate the electro-optical crystals which are used for switching the polarization of high intensity laser beams. Further, when high intensity laser beams are used for applications that require extremely precise procedures, such as ophthalmic surgery, the intensity and repetition rate of the pulses in the beam need to be established with precise certainty.

In a regenerative amplifier, the intensity of a laser pulse is increased or amplified by reflecting the pulse back and forth in a cavity to cause the pulse to repetitively pass through a gain medium. For effective amplification, however, the gain medium must be pumped to a level where it has sufficient energy which can be transferred to the pulse to thereby amplify the intensity of the pulse. Several time factors affect this process. First, there is the time necessary to pump the gain medium to a level where it has the requisite energy to amplify the pulse. Second, there is the time for amplification of the pulse. And third, there is the combined effect of the first and second factors which determines the time between pulses or the pulse repetition rate of the generated laser beam. It happens, that the "ringing" of the electro-optical switch influences all of these time factors. Specifically, consider the fact that a laser pulse will be trapped within the cavity of the regenerative amplifier while the electro-optical switch, i.e. the Pockel's Cell is electrically activated. During this time the pulse repetitively passes through the gain medium and is amplified. Then, upon deactivation of the electro-optical switch, the amplified pulse is released or "dumped" from the cavity. Once the switch is deactivated, the gain medium in the cavity must again be pumped to a higher energy level to amplify the intensity of the next pulse. Unfortunately, any ringing of the electro-optical switch retards the initiation of this process for pumping the gain medium. Thus, if the ringing of the electro-optical switch can be minimized, the effective pumping of the gain medium can be initiated earlier, and the pulse repetition rate of the generated laser beam can be increased. This repetition rate is, of course, a very important characteristic of a laser beam.

In light of the above, it is an object of the present invention to provide an optical switch for a laser cavity dumper which is effectively damped to reduce ringing by the switch. Another object of the present invention is to preserve an optical window through the crystal for a period of time during which this window, at the center of the crystal, experiences only the electro-optical effect caused by an applied electrical field and does not experience the "ringing" which is caused by acoustic waves. Yet another object of the present invention is to provide an optical switch which allows for a relatively high repetition rate for the generation of laser pulses. Another object of the present invention is to provide an optical switch for a laser cavity dumper which is able to provide relatively long optical windows (openings) for a regenerative amplifier. Still another an, object of the present invention is to provide an optical switch for a laser cavity dumper which is relatively easy to manufacture and comparatively cost-effective.

SUMMARY OF THE INVENTION

An optical switch for changing the polarization of a laser beam within the cavity of a regenerative amplifier includes an acoustic reservoir which mechanically dampens the electrically induced vibrations of an electro-optical crystal. Specifically, the acoustic reservoir has a mass which is impedance matched with the electro-optical crystal and attached directly onto a surface of the crystal. As so attached, the reservoir absorbs the vibrational energy of the crystal which results when the crystal is deformed in response to an applied electrical field.

As contemplated by the present invention, the electro-optical crystal is elongated and has a substantially rectangular cross-section to define an upper surface, a lower surface, and a pair of opposed side surfaces therebetween. Preferably, the distance between the side surfaces of the crystal is approximately twice the distance between the upper and lower surfaces. The electrical field necessary to activate the crystal, and thereby change the polarization of light passing through the crystal, is applied between the upper and the lower surfaces. Consequently, an acoustic reservoir can be attached to either one or both of the side surfaces. With this configuration, the acoustic reservoirs absorb vibrations of the crystal which are in a direction (i.e. y-direction) that is substantially perpendicular to both the longitudinal axis of the electro-optical crystal (z-direction) and the direction in which the electrical field is applied to the crystal (x-direction). Further, since the piezoelectic effect causes acoustic waves to be initiated at the surface of the crystal, and since the strongest acoustic waves travel in the y-direction; the increased dimension of the crystal in the y-direction effectively delays disturbances at the center of the crystal. This delay allows a longer time for the optical window through the crystal which is created by the electro-optical effect.

Preferably, the acoustic reservoirs are block structures which are made of a plastic such as PMMA. These blocks can be of any desired shape but, in any case, must have sufficient mass to effectively dampen the expected vibrations of the electro-optical crystal. Additionally, the external surfaces of the blocks which are used for the acoustic reservoirs, and which are not placed in contact with the crystal, may be textured to reduce the reflection of acoustical waves within the reservoir. Further, dielectric panes can be mounted between the crystal and each of the reservoirs. If used, the dielectric panes. are preferably made of a material, such as glass, which is effectively impedance matched with the electro-optical crystal and the acoustic reservoirs.

The novel features of this invention, as well as the invention itself, both as to its structure and its operation, will be best understood from the accompanying drawings, taken in conjunction with the accompanying description, in which similar reference characters refer to similar parts, and in which:

DESCRIPTION OF THE PREFERRED EMBODIMENT

Figure 1:
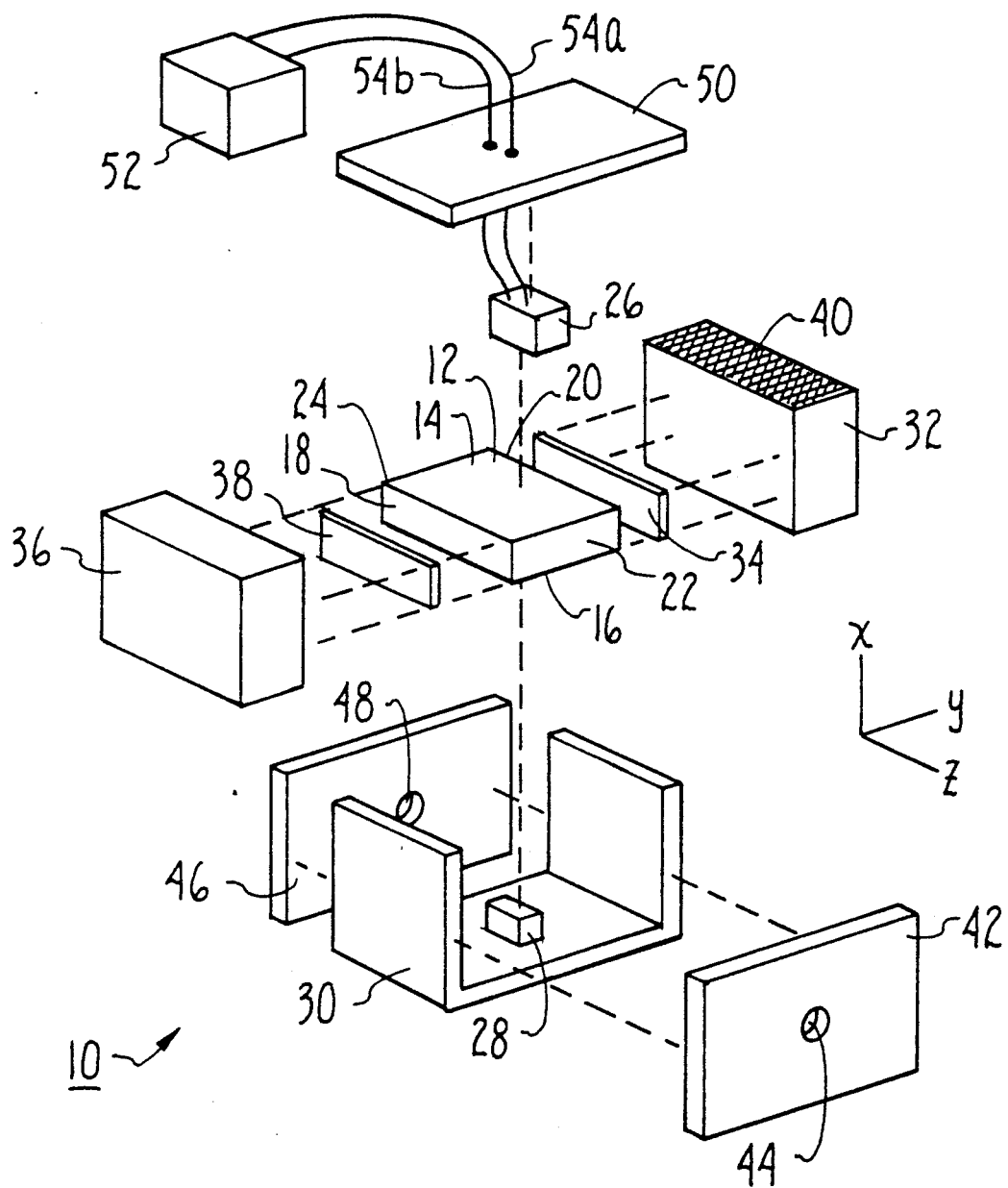
FIG. 1 is an exploded view of the optical switch of the present invention.

Referring initially to FIG. 1, an electro-optical switch in accordance with the present invention is generally designated 10 and is shown with its components in an exploded configuration. As shown in FIG. 1, electro-optical switch 10 includes an electro-optical crystal 12 which typically has an elongated structure with a substantially rectangular cross section. Specifically, the crystal 12 is shown to have an upper surface 14, a lower surface 16 and a pair of opposed side surfaces 18 and 20 which are defined between the upper surface 14 and the lower surface 16. As also shown in FIG. 1, the side surfaces 18 and 20 are separated from each other by a distance which is approximately twice the distance between the upper surface 14 and the lower surface 16. Additionally, the ends of crystal 12 establish an optical window 22 and an optical window 24 which are separated from each other by the various surfaces 14, 16, 18 and 20. For reference purposes, as shown in FIG. 1, the x-direction on crystal 12 extends between the upper surface 14 and lower surface 16, the y-direction extends between the side surfaces 18 and 20, and the z-direction extends between the optical windows 22 and 24. Preferably, crystal 12 is of a type which is commonly used for laser cavity dumpers and is preferably made of LiNbO$_3$.

Electro-optical switch 10 also includes an electrical connector 26 which is electrically attached to the upper surface 14 of crystal 12 in any manner well known in the pertinent art. Further, switch 10 includes an electrical ground 28 which is attached to the lower surface 16 of crystal 12 in any manner well known in the pertinent art. Consequently, an electric field will pass through the crystal 12 in the x-direction. For purposes of the present invention, both the electrical connector 26 and the electrical ground 28 can be made of copper or some similar electrically conducting material. A base 30 is provided, and the electrical ground 28 is operatively mounted on the base 30 substantially as shown.

In accordance with the present invention, an acoustic reservoir 32 is attached to the side surface 20 of crystal 12. More specifically, a dielectric pane 34, which is impedance matched with crystal 12, is attached to the side surface 20 of crystal 12 and the acoustic reservoir 32 is attached to dielectric pane 34. Preferably, acoustic reservoir 32 is a block that is made of a plastic material, such as lucite or Bakelite or aluminum. Importantly, acoustic reservoir 32 has sufficient mass to absorb the piezoelectric vibrations of crystal 12. Also, dielectric pane 34, if used, is preferably made of glass. As implied, dielectric pane 34 may be omitted from electro-optical switch 10, and acoustic reservoir 32 may be disposed directly against side surface 20 of crystal 12 under circumstances desired by the user. When operatively positioned against each other, a glue or solvent bonding may be selectively used between crystal 12, dielectric pane 34 and acoustic reservoir 32 to hold these components together. On the other hand, no glue or solvent bonding may be needed for this purpose.

FIG. 1 also shows that the electro-optical switch 10 can include a second acoustic reservoir 36 and a second dielectric pane 38. As indicated in FIG. 1, acoustic reservoir 36 is either directly attached to side surface 18 of electro-optical crystal 12, Or is attached to side surface 18 through the dielectric pane 38. As so positioned, the reservoirs 32, 36 absorb energy in the piezoelectric vibrations which propagate through the crystal 12 in the ydirection. In all important respects, acoustic reservoir 36 is similar to acoustic reservoir 32, and dielectric pane 38 is similar to dielectric pane 34.

In order to further diminish or retard the reflection of energy waves within the acoustic reservoirs 32 and 36, and thereby inhibit repropagation of this energy through the crystal 12, the surfaces of the reservoirs 32 and 36 may be textured. Specifically, and only by way of example, a textured surface 40 is shown on acoustic reservoir 32. Although only one such textured surface is shown, it is to be appreciated that similar textured surfaces may be selectively used on acoustic reservoir 36 as well as acoustic reservoir 32. Which surfaces are to be textured, and the exact nature of the texturing, is a matter of preference for the user.

The assembly of electro-optical switch 10 is accomplished by positioning the reservoirs 32 and 34 in acoustic contact with the electro-optical crystal 12 and placing this combination on base 30 with crystal 12 electrically connected between the electrical connector 26 and the electrical ground 28. A front plate 42 is attached to the base 30, as indicated, with the aperture 44 of plate 42 positioned over end 22 of crystal 12. Similarly, a rear plate 46 is attached to the base 30, as indicated, with the aperture 48 of plate 46 positioned over end 24 of crystal 12. With this assembly, a light path is established through switch 10 that passes through the apertures 44 and 48 and along the longitudinal axis of crystal 12 in the z-direction between the optical windows 22 and 24. A lid 50 is provided, and is connected with base 30 as indicated, to completely enclose the above disclosed components in switch 10.

A voltage source 52, of a type well known in the pertinent art, is provided and is electrically connected with connector 26 via the electrical leads 54a and 54b. For purposes of the present invention, the level of voltage provided by the voltage source 52, its duration and its repetition rate is determined by the user. Preferably, for purposes of the present invention, voltage source 52 should be able to deliver 3000 volts for durations of 10 $\mu$s at a rate of 5 KHz.

OPERATION

Figure 2:
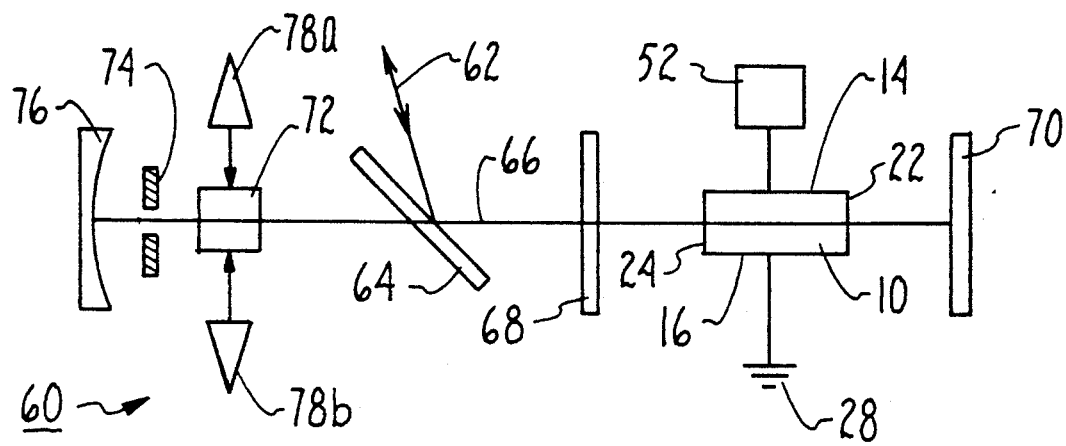
FIG. 2 is a schematic diagram of a regenerative amplifier incorporating an optical switch in accordance with the present invention.

In the operation of the present invention, the electro-optical switch 10 is mounted in a regenerative amplifier, such as the regenerative amplifier which is schematically shown in FIG. 2 and which is generally designated 60. When a pulsed laser beam 62 is directed toward a polarizing beam splitter 64 that is positioned within the cavity of regenerative amplifier 60, it is reflected by the beam splitter 64 and directed along optical path 66. In sequence, pulses of laser beam 62 then pass through quarter wave plate 68 and the switch 10 and are incident upon a flat 100% mirror 70 where they are reflected back through the switch 10 and quarter wave plate 68. It is to be understood that quarter wave plate 68 is of any type well known in the pertinent art and that switch 10 is commonly referred to, by type, as a Pockel's Cell.

After being reflected by flat 100% mirror 70 through quarter wave plate 68, the pulse has passed through quarter wave plate 68 twice. This causes the plane of polarization of pulses in laser beam 62 to be rotated a total of 90 degrees. This rotation allows the pulses to pass through polarizing beam splitter 64 and continue along optical path 66 to be successively incident upon gain medium 72, pass through aperture 74 and be reflected back through aperture 74 and gain medium 72 by curved 100% mirror 76. It will be appreciated that during this initial passage of laser beam 62 through regenerative amplifier 60, switch 10 is not activated by voltage source 52. Consequently, the next two passes through quarter wave plate 68 will rotate beam 62 another ninety degrees, and the pulses in beam 62 which have traversed the cavity of regenerative amplifier 60 will be "dumped" from the cavity by beam splitter 64.

During passage, however, pulses in laser beam 62 can be confined within regenerative amplifier 60 for reciprocal reflection along optical path 66 depending upon further rotations in polarization imparted to the pulses of laser beam 62 as they pass through switch 10. If switch 10 is activated by voltage source 52 to rotate each pulse an additional ninety degrees during its two passes through switch 10, both quarter wave plate 68 and switch 10 will combine their effects to rotate the plane of polarization of each pulse through one hundred and eighty degrees. Thus, each time a pulse is incident on polarizing beam splitter 64, it will pass therethrough and be effectively captured in reflections along optical path 66. Subsequently, the voltage activation of switch 10 by voltage source 52 can be removed to bring each pulse of laser beam 62 into a polarization alignment for reflection of the pulse out of the optical path 66 in the cavity of regenerative amplifier 60 by the polarizing beam splitter 64.

FIG. 2 also shows that pulsed laser beam 62, as it passes along optical path 66 in the cavity of regenerative amplifier 60 is influenced by a pumping chamber which includes the gain medium 72 and a plurality of laser diodes, of which the laser diodes 78a and 78b are representative. By a procedure popularly known in the pertinent art as "pumping", the laser diodes 78a and 78b increase the energy within gain medium 72. One purpose of regenerative amplifier 60 is, of course, to transfer the increased energy from gain medium 72 to the pulses in laser beam 62. How this happens, and the effect the present invention has on this process, is perhaps best appreciated by reference to FIGS. 3A, 3B, 3C, and 3D.

Figure 3A:
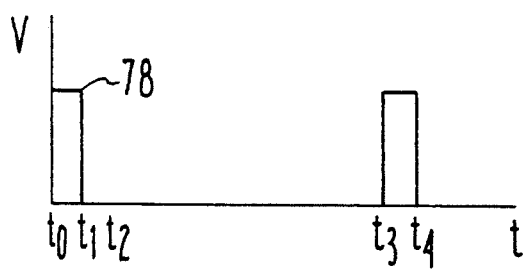
FIG. 3A is a graph showing the time relationship for high voltage excitations of the optical switch.
Figure 3B:
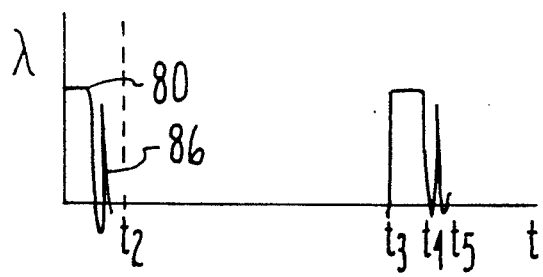
FIG. 3B is a graph showing the polarizing effect of the optical switch as a function of time in response to the voltage excitations shown in FIG. 3A.

FIG. 3A graphically depicts a voltage level 78 which is used to excite electro-optical crystal 12. Specifically, the voltage level 78 is determined as that level of voltage necessary to cause a ninety degree rotation in the polarization of pulses in beam 62 as they pass twice through the crystal 12. In one pass through the crystal 12, the plane of polarization is rotated forty-five degrees. The result is that polarization 80 occurs during the time indicated in FIG. 3B (i.e. polarization 80 corresponds to a forty-five degree rotation of light in beam 62 for each pass through the crystal 12). Further, this polarization 80 will continue as long as the voltage level 78 is applied to crystal 12.

As indicated above, when crystal 12 is excited in this manner the pulses of beam 62 remain trapped within the cavity of regenerative amplifier 60 and, while so trapped, the pulses of beam 62 extract the energy which is built up in gain medium 72. This extraction of energy from gain medium 72 is the energy decrease 82 of gain medium 72 (graphically shown in FIG. 3C) and is effectively the same as the transfer energy 84 (graphically shown in FIG. 3D) which is transferred from the gain medium 72 to pulses in beam 62. Importantly, voltage level 78 causes polarization 80 of crystal 12 during the time period the decrease energy 82 from gain medium 72 passes as transfer energy 84 to pulses in laser beam 62. As depicted in FIGS. 3A, 3B, 3C and 3D, all this happens between time $t_0$ and time $t_1$.

Figure 3C:
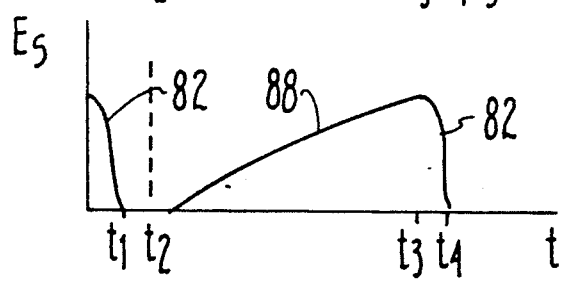
FIG. 3C is a graph showing the energy level in the gain medium of the regenerative amplifier as a function of time.
Figure 3D:
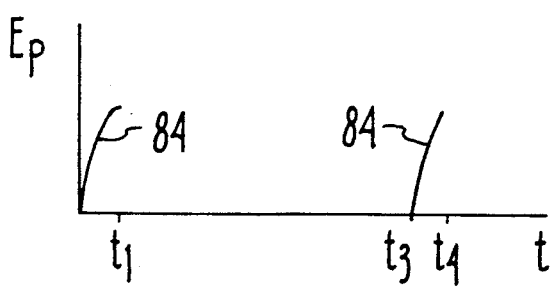
FIG. 3D is a graph showing the energy level transferred to sequential pulses as these pulses transit the regenerative amplifier.

A problem, however, arises at time $t_1$ which concerns the ability of crystal 12 to continue to predictably rotate the polarization of the laser pulses as they pass through the crystal 12. As indicated above, the piezoelectric effect and the strain optical effect will cause crystal 12 to vibrate, or "ring". This "ringing" is shown graphically in FIG. 3B as a dither 86. Importantly, as long as dither 86 occurs, gain medium 72 does not increase its energy level. Thus, the increase energy 88 for gain medium 72, as shown in FIG. 3C, is delayed. Consequently, the time $t_3$ at which the next voltage level 78 can be applied to crystal 12 is also delayed. The result is that the dither 86 experienced by crystal 12 effectively reduces the repetition rate at which amplified laser pulses can be "dumped" from the cavity of regenerative amplifier 60. By appropriately attaching acoustic reservoirs 32 and 36 to the electro-optical crystal 12, as disclosed herein, dither 86 is significantly reduced and the repetition rate of amplified pulses in the laser beam 62 is correspondingly increased. The utility of the acoustic reservoirs 32 and 36, however, is realized only after $t_1$ when the acoustic waves which have already traveled through the crystal 12 are absorbed by the acoustic reservoirs 32 and 36.

The effect of these first acoustic waves which initially propagate through the crystal 12, i.e. not reflected waves, cannot be eliminated. Their impact, however, can be delayed. In another aspect of the present invention, the time interval is effectively lengthened between $t_0$, when the electric field is applied to the crystal 12 and the piezoelectric effect initiates propagation of an acoustic wave through the crystal 12, and $t_1$, when the first acoustic wave passes through approximately the center of the crystal 12. This is done to allow more effective amplification of the laser pulses in pulsed laser beam 62 by the gain medium 72.

As indicated above, when crystal 12 is activated by an electrical field to change the polarization of the laser light passing therethrough due to the electro-optical effect, the crystal 12 also deforms due to the piezoelectric effect. The full consequence of the piezoelectric effect, however, extends over a period of time and results in the following sequence of events. With the application of an electric field to the crystal 12 at time $t_0$, the electro-optic effect is immediate throughout the crystal 12. The piezoelectric effect, on the other hand, is not immediately detectable throughout the crystal 12. Instead, the piezoelectric effect initially manifests itself as a deformation of the crystal 12 at the surfaces of the crystal 12. This deformation is then propagated through the crystal 12 as a wave and results in acoustic vibrations. If undamped, this wave will be reflected back and forth through the crystal 12. After once passing through the crystal 12, however, the waves are effectively absorbed by the acoustic reservoirs 32 and 36 to dampen the vibratory response of crystal 12. Thus, any deformation of crystal 12 which might be caused by a reflected wave is greatly diminished. Nevertheless, the first wave will propagate unchecked through the crystal 12.

It happens that, due to the anisotropic nature of the crystal 12, when an electrical field is applied across the crystal 12 in the x-direction (as shown in FIG. 1) the most pronounced acoustic wave is propagated in the y-direction. Furthermore, the acoustic waves do not propagate instantaneously through the crystal 12. Consequently, at any point within the crystal 12 there is a limited period of time, after application of the electric field but before the arrival of the acoustic wave, during which only the electro-optic effect is operative. The center of crystal 12, because it is the farthest point from where the acoustic waves begin, will experience the longest period of time in pure electro-optic effect without being disturbed by an acoustic wave. In order to delay the effect of the acoustic wave, it is necessary to properly dimension the crystal 12 so that a substantial portion of the center of crystal 12 is undisturbed by acoustic waves while pulses in beam 62 are being amplified during the interval between $t_0$ and $t_1$.

Since the greatest acoustical disturbance will occur in the y-direction, the center of crystal 12 can remain effectively undisturbed for a longer period of time by increasing the distance between the side surfaces 18 and 20, i.e. extending crystal 12 in the y-direction. For the electro-optical switch 10 of the present invention, this is accomplished by making the distance between side surfaces 18 and 20 approximately twice as great as the distance between the upper surface 14 and the lower surface 16. Consequently, the time interval during which the center portion of crystal 12 can polarize light under only the electro-optical effect, (i.e. between $t_0$ and $t_1$) will depend on how fast an acoustic wave will propagate to the center of the crystal 12 from either side surface 18 or 20. Preferably this time interval between $t_0$ and $t_1$, is approximately one and one half microseconds (1.5 $\mu$sec). Between the times $t_1$ and $t_2$ all of crystal 12 is experiencing the piezoelectric effect and consequently the strain optic effect will cause some dither 86. After time $t_2$, however, acoustic reservoirs 32 and 36 begin to absorb the acoustic waves and thereby limit the effect of reflected waves.

As a practical matter it is only necessary to capture laser pulses in regenerative amplifier 60 during the extended time interval between $t_0$ and $t_1$. This, of course is made possible by extending the dimensions of crystal 12 in the y-direction. On the other hand, after $t_1$ it is necessary to reduce any dither 86 which would interfere with the build up of energy in gain medium 72. This, of course, is made possible by the incorporation of acoustic reservoirs 32,36.

Due to the relatively smaller acoustic wave which is propagated in the x-direction, there is no need to correspondingly extend the crystal 12 in the x-direction. Indeed, to do so would require greater voltage from the voltage source 52 to achieve the same electro-optical effect. With the reduction of dither 86 by the incorporation of acoustic reservoir 32 and 38, and with the longer optical window for switch 10 which is made possible by appropriately extending the dimensions of crystal 12 in the y-direction, electro-optical switch 10 makes it possible to attain pulse repetition rates of approximately 5 KHz.

While the particular POCKEL CELL DAMPING SYSTEM as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

I claim:

1. An optical switch for changing the polarization of a laser beam along the path of said laser beam while dampening the acoustical vibrations of the switch, which comprises:
   an electro-optical crystal disposed in said path of said laser beam, said crystal being elongated and having a substantially rectangular cross section to define an upper surface, a lower surface and a pair of opposed side surfaces therebetween, wherein the distance between said side surfaces is approximately twice the distance between said upper surface and said lower surface;
   means for selectively generating an electrical field through said crystal in a direction substantially perpendicular to the path of said laser beam; and
   a pair of opposed acoustic reservoirs separately attached to said crystal for damping acoustical vibrations of said crystal of said switch caused by said electrical field in a direction substantially perpendicular to both the electrical field and said path of said laser beam through said crystal.

2. An optical switch as recited in claim 1 wherein the distance between said side surfaces is sufficiently great to require approximately three microseconds (3 $\mu$s) for an acoustic wave to pass from on said side surface to the other said side surface.

3. An optical switch as recited in claim 1 further comprising an electrical ground connected to said lower surface and an electrical lead connecting said means for generating an electrical field to said upper surface.

4. An optical switch as recited in claim 1 further comprising a pair of dielectric panes, each said pane being disposed between one of said side surfaces of said crystal and one of said acoustic reservoirs to electrically isolate said reservoir from said crystal.

5. An optical switch as recited in claim 4 wherein said pair of dielectric panes are made of glass.

6. An optical switch as recited in claim 4 wherein said acoustic reservoirs are each made of plastic.

7. An optical switch as recited in claim 4 wherein said acoustic reservoirs are each made of aluminum.

8. An optical switch as recited in claim 4 wherein each of said reservoirs define noncontact surfaces external to said pane, and at least a portion of said noncontact surfaces is textured to retard the reflection of acoustic wave in said reservoir.

9. A device for use in a regenerative amplifier to dampen an acoustical response of a laser cavity damper to an applied electrical field which comprises:
   an elongated electro-optical crystal mounted in said regenerative amplifier, said crystal being elongated and having a substantially rectangular cross section to define an upper surface, a lower surface and a pair of opposed side surfaces therebetween, wherein the distance between said opposed side surfaces is approximately twice the distance between said upper surface and said lower surface; and
   an acoustic reservoir, impedance matched with said crystal and attached to said crystal, said reservoir being of sufficient mass, to absorb and dissipate said acoustic response of said crystal.

10. An optical switch as recited in claim 9 wherein the distance between said opposed side surfaces is sufficiently great to require approximately three microseconds (3 $\mu$s) for an acoustic wave to pass between said opposed side surfaces.

11. A device as recited in claim 9 further comprising an electrical ground connected to said lower surfaced and an electrical lead connecting said upper surface with a means for generating said electrical field between said lower surface and said upper surface.

12. A device as recited in claim 9 wherein said electro-optical crystal is mounted in said regenerative amplifier in a path of a laser beam and said electrical field is applied to said crystal in a direction that is substantially perpendicular to said path of said laser beam.

13. A device as recited in claim 9 further comprising a dielectric pane, said dielectric pane being impedance matched with said crystal and attached to said crystal between said crystal and said acoustic reservoir to electrically isolate said crystal from said reservoir.

14. A device as recited in claim 9 further comprising a second acoustic reservoir and, said second acoustic reservoir being impedance matched with said crystal and attached to one of said side surfaces of said crystal, said second acoustic reservoir being of sufficient mass to absorb and dissipate said acoustic response.

15. A device as recited in claim 9 further comprising a second dielectric pane, said dielectric pane being impedance matched with said crystal and attached to one of said side surfaces of said crystal between said crystal and said second acoustic reservoir to electrically isolate said crystal from said second reservoir.

16. A device as recited in claim 15 wherein each of said dielectric panes is made of glass.

17. A device as recited in claim 15 wherein said acoustic reservoir and said second acoustic reservoir are made of PMMA plastic.

18. A device as recited in claim 15 wherein each of said acoustic reservoirs has a noncontact surface external to said dielectric panes and at least a portion of said noncontact surface is textured to retard the reflection of acoustic waves within said reservoirs.

19. A method for damping an acoustical response of an elongated electro-optical crystal to the application of an electrical field, said crystal having a substantially rectangular cross-section to define an upper surface, a lower surface, and a pair of opposed side surfaces therebetween, the distance between said side surfaces being approximately twice the distance between said upper surface and said lower surface which comprises the steps of:

mounting the electro-optical crystal in a cavity of a regenerative amplifier in a path of laser pulses which enter the cavity;

attaching an acoustic reservoir to one of said sided surfaces of said crystal, said reservoir being of sufficient mass to absorb and dissipate said acoustic response of said crystal; and selectively applying the electrical field across the crystal from the upper to the lower surface.

20. A method as recited in claim 19 further comprising the step of disposing a dielectric pane between said crystal and said reservoir, said dielectric pane being impedance matched with said crystal and positioned to electrically isolate said crystal from said acoustic reservoir.

21. A method as recited in claim 20 further comprising the steps of disposing a second dielectric pane against a side surface of said crystal and attaching a second acoustic reservoir to said second dielectric pane to position said second pane between said crystal and said second acoustic reservoir to electrically isolate said second acoustic reservoir from said crystal.

* * * * *